Patented July 1, 1930

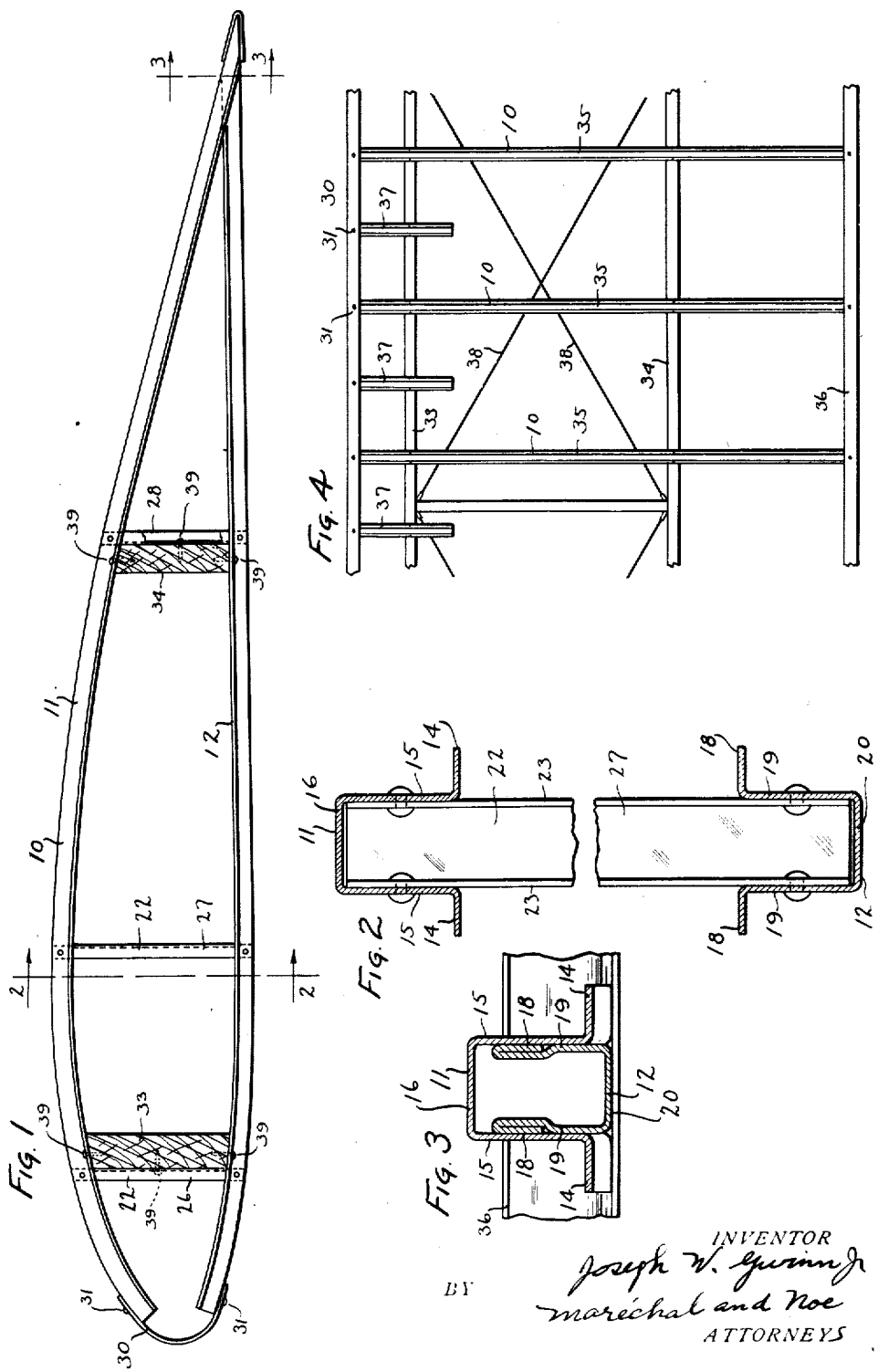

1,769,574

UNITED STATES PATENT OFFICE

JOSEPH M. GWINN, JR., OF BUFFALO, NEW YORK, ASSIGNOR TO CONSOLIDATED AIRCRAFT CORPORATION, OF BUFFALO, NEW YORK, A CORPORATION OF NEW YORK

AIRCRAFT

Application filed February 27, 1929. Serial No. 343,213.

This invention relates to aircraft, and more particularly to aircraft wing structure.

One object of the invention is the provision of an aircraft rib formed of stampings curved to define the wing contour and intertied at the spar positions, the rib stampings taking load primarily as two approximately parallel beams.

Another object of the invention is the provision of a rib of this character in which substantially vertical ties connect the upper and lower rib members, the rib being substantially devoid of diagonal bracing.

Another object of the invention is the provision of an aircraft wing comprising a series of such ribs connected to wing spars by means of simple fastening means such as nails or the like.

Other objects and advantages of the invention will be apparent from the following description and from the accompanying drawing, in which—

Fig. 1 is a side elevation of a wing rib embodying the present invention;

Fig. 2 is a section on the line 2—2 of Fig. 1;

Fig. 3 is a section on the line 3—3 of Fig. 1; and

Fig. 4 is a top plan view of a portion of a wing structure embodying the present invention.

Referring more particularly to the drawing by reference numerals, like numbers designating like parts in the various views, 10 designates generally an aircraft wing rib comprising top and bottom longitudinally extending members 11 and 12 shaped or curved so as to define the wing contour in the direction of the line of flight. These rib members are constructed preferably as sheet metal stampings, formed of dural or other suitable light strong material. Preferably they are of a form shown in Fig. 2 substantially U or channel shaped and having the outwardly extending flanged edges 14. The member 11 thus comprises the two flanged edges 14, the two side portions 15 and the top portion 16. The lower member 12 is correspondingly shaped, but with the channel facing the center of the rib, the lower member 12 comprising the flanged edges 18, side portions 19 and the bottom portion 20.

Extending between the top and bottom rib members 11 and 12 are substantially vertical ties shown in the form of sheet metal channel stampings 22 preferably of channel shape. The ends of these ties extend up into the channel of the top rib member 11 and down into the channel of the lower rib member 12, the opposite sides 23 of the channel ties being riveted or otherwise connected to the side portions 15 and 19 of the rib members, as shown. The ties 22 are preferably spaced apart longitudinally as shown in Fig. 1, there being a front tie 26, one or more intermediate ties 27 and a rear tie 28. The front tie 26 is near the front of the rib and provided immediately adjacent the position of the front wing spar or beam. The rear tie 28 is positioned on the rib immediately adjacent the location of the rear wing spar, the tie 27 being located between the front and rear ties and preferably in the region of the mean center of pressure. These various ties interconnecting the top and bottom rib members 11 and 12 take load either under compression or tension and preferably are the only interconnection between the rib members mentioned, the rib being thus devoid of diagonal bracing, and therefore taking load primarily as two approximately parallel beams rather than as a truss.

At the rear of the rib the two rib members 11 and 12 are fastened together. Preferably the flanged edges 18 of the bottom member 12 are bent down at the end of the rib along the side portions 19, and the mitered rear end of member 12 is pushed up into the channel of the top member 11, the two parts being riveted or otherwise attached together. The front ends of the members 11 and 12 preferably stop just short of the leading edge of the wing, and these front ends may be connected to a leading edge strip 30 by means of rivets 31 or the like, these rivets fastening the rib members 11 and 12 to the leading edge strip when the various ribs are assembled in place during the assembling of the wing.

In Fig. 4 there is shown a portion of an aircraft wing or airfoil comprising the front and rear wing spars 33 and 34, a series of spaced ribs 35 similar to rib 10, leading edge strip 30, and trailing edge strip 36. The trailing edge strip like the leading edge strip is fastened to the ends of the ribs when the ribs are assembled in place during the construction of the wing. As shown in this figure the front portion of the wing is provided with additional form defining members 37 between the various ribs 35; and diagonal wiring 38 is provided horizontally in the wing surface to interconnect the wing spars in the usual manner. The two wing spars 33 and 34 are positioned immediately adjacent the locations of the two ties 26 and 28 of the ribs, these ties lying preferably to the front of wing spar 33, and to the rear of wing spar 34 respectively. In a wing of comparatively small vertical thickness the wing spars extend preferably from the lower side of the member 11 to the upper side of the lower member 12. The beams are attached directly to the rib by nails 39 or the like which may extend through holes provided either in the flanges 14 and 18 of the ribs or in the ties 26 and 28, and project into the spars so that the ribs are definitely located with relation to the spars. Where the wing beams lie between the front and rear ties 26 and 28, the wing ribs may be easily moved along the wing spars when the various parts are being assembled, and when approximately in place the wing spars may be moved apart to their proper positions adjoining the ties 26 and 28 and the ribs then secured in place.

The vertical tie members at the spars provided in the manner set forth relieve the manufacturer of the necessity of making any strong attachment between the spars and the rib members. Upward lift on the upper channel or member 11 is transferred down through the ties to the lower channel or member 12 which in turn bears on the bottom face of the spar. The intermediate channel or tie between the spars interconnects the top and bottom rib members 11 and 12 so that they deflect together in bending, thus reinforcing each other somewhat. The rib is quite rigid in construction and is able to withstand a great deal of handling in the shop. Most ribs of prior construction are so flimsy before they are assembled in the wing that great care must be exercised in handling them. Where the wing parts are arranged as shown, and the two rib members 11 and 12 are devoid of diagonal interconnecting trussing, there is no interference with aileron operating mechanism, drag bracing, or other things which it may be desired to put inside of the wing.

Trussed or diagonally braced ribs are very difficult to lay out so that the various things in the wing will not be interfered with. Another advantage of this wing rib is that where it is used on a thick wing it is not necessary to use the full depth of the wing for the spar height as the rib may be just as easily attached to a shallower spar. Under such conditions of course there is some space between the top of the spar and the lower side of the rib member 11. The present wing rib, being made of a few simple parts constructed preferably as sheet metal stampings provides for a very economical construction and one in which the parts are very easily assembled and in which the rib is easily assembled on the wing spars.

During the assembly of the wing, after the wig spars have been moved away from each other until they touch their locating channel ties, the leading and trailing edge strips are aplied and the wing covered with fabric material or the like. Suitable holes are provided preferably spaced along centrally of the top and bottom portions 16 and 20 of the rib members to facilitate the attachment of the wing covering.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A wing rib for aircraft wings comprising top and bottom longitudinally extending sheet metal members of substantially channel shape and having outwardly extending flanged sides, said members being curved to define the wing contour, sheet metal ties of substantially channel shape extending substantially vertically between said members and projecting into the channel portions of said members and attached thereto, said ties being positioned along said rib at places substantially corresponding to front and rear wing spar positions.

2. A metallic wing rib for aircraft wings comprising top and bottom longitudinally extending rigid sheet metal members curved to define the wing contour, said members being of substantially channel shape having outwardly extending flanged sides, longitudinally spaced interconnecting sheet metal ties effective in both tension and compression attached at their ends to said members and including a substantially vertical front tie near the front of the rib at a point immediately adjacent the front wing spar position, a substantially vertical rear tie at a point immediately adjacent the rear wing spar position, and a single tie between said front and rear ties.

3. A wing rib for aircraft wings comprising top and bottom longitudinally extending sheet metal members of substantially channel shape and having outwardly extending flanged sides, said members being curved to define the wing contour, sheet metal ties extending substantially vertically between said members and projecting into the channel portions of said members and attached thereto, said ties being positioned along said rib at places substantially corresponding to front and rear wing spar positions, and a substantially U-shaped sheet metal leading edge strip attached to the outer sides of the front ends of said longitudinally extending members.

4. An aircraft wing comprising a series of wing ribs having top and bottom longitudinally extending substantially channel shaped sheet metal members and substantially vertical interconnecting sheet metal ties extending into and attached to said members, a substantially U-shaped sheet metal leading edge strip attached to the outer sides of the front ends of said members, a trailing edge strip attached to the rear ends of said members, front and rear wing spars extending through said ribs and attached directly thereto and against which the upper sides of the bottom longitudinal members contact, said ties forming substantially the sole interconnection between the members of the ribs between the wing spar positions so that the ribs are devoid of diagonal bracing.

In testimony whereof I hereto affix my signature.

JOSEPH M. GWINN, Jr.

---

CERTIFICATE OF CORRECTION.

Patent No. 1,769,574.  Granted July 1, 1930, to

JOSEPH M. GWINN, JR.

It is hereby certified that the State of Incorporation of the assignee in the above numbered patent was erroneously given as "New York", whereas said State should have been given as Delaware, as shown by the records of assignments in this office; and that the said Letters Patent should be read with this correction therein that the same may conform to the record of the case in the Patent Office.

Signed and sealed this 2nd day of September, A. D. 1930.

M. J. Moore,
Acting Commissioner of Patents.

(Seal)

3. A wing rib for aircraft wings comprising top and bottom longitudinally extending sheet metal members of substantially channel shape and having outwardly extending flanged sides, said members being curved to define the wing contour, sheet metal ties extending substantially vertically between said members and projecting into the channel portions of said members and attached thereto, said ties being positioned along said rib at places substantially corresponding to front and rear wing spar positions, and a substantially U-shaped sheet metal leading edge strip attached to the outer sides of the front ends of said longitudinally extending members.

4. An aircraft wing comprising a series of wing ribs having top and bottom longitudinally extending substantially channel shaped sheet metal members and substantially vertical interconnecting sheet metal ties extending into and attached to said members, a substantially U-shaped sheet metal leading edge strip attached to the outer sides of the front ends of said members, a trailing edge strip attached to the rear ends of said members, front and rear wing spars extending through said ribs and attached directly thereto and against which the upper sides of the bottom longitudinal members contact, said ties forming substantially the sole interconnection between the members of the ribs between the wing spar positions so that the ribs are devoid of diagonal bracing.

In testimony whereof I hereto affix my signature.

JOSEPH M. GWINN, Jr.

CERTIFICATE OF CORRECTION.

Patent No. 1,769,574.             Granted July 1, 1930, to

JOSEPH M. GWINN, JR.

It is hereby certified that the State of Incorporation of the assignee in the above numbered patent was erroneously given as "New York", whereas said State should have been given as Delaware, as shown by the records of assignments in this office; and that the said Letters Patent should be read with this correction therein that the same may conform to the record of the case in the Patent Office.

Signed and sealed this 2nd day of September, A. D. 1930.

(Seal)

M. J. Moore,
Acting Commissioner of Patents.